Figure 1:
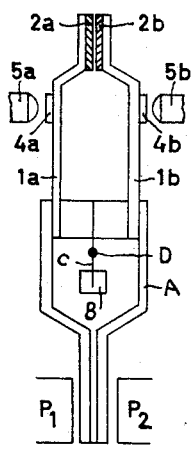

June 9, 1959

O. RÖMER ET AL 2,890,314

MOTION-STOPPING DEVICE WITH FRICTION
SURFACES, PARTICULARLY FOR ELECTRIC
CONTACT APPARATUS

Filed June 3, 1955

Inventors:
Otto Römer
and
Kurt Reche

United States Patent Office 2,890,314
Patented June 9, 1959

2,890,314

MOTION-STOPPING DEVICE WITH FRICTION SURFACES, PARTICULARLY FOR ELECTRIC CONTACT APPARATUS

Otto Römer, Berlin-Siemensstadt, and Kurt Reche, Pullach, Munich, Germany, assignors to Siemens & Halske Aktiengesellschaft, Berlin-Siemensstadt and Munich, Germany, a corporation of Germany Application June 3, 1955, Serial No. 513,117

Claims priority, application Germany June 4, 1954

7 Claims. (Cl. 200—166)

Our invention relates generally to stopping devices for limiting the movement of structure and, in a more particular aspect, to electric contact devices in which a periodically movable or oscillating contact structure cooperates with stationary contact pieces to make and break an electric circuit.

Such devices have been provided with friction surfaces serving to prevent bouncing, especially when closing the circuit by engagement of a movable contact with a stationary contact. For satisfactory results, the mutually contacting surfaces must steadily glide upon, and unformly rub against, each other. This is possible only if the friction surfaces are smooth and clean. However, in electrically controlled contact devices such as relays, mechanically operating rectifiers, converters of the pendulous type and the like periodically actuated apparatus, the just-mentioned condition is the more difficult to fulfill the higher the switching frequency of the apparatus.

With mutually rubbing friction surfaces made of respective materials of similar properties, a rather unfavorable, non-uniform friction resistance has been found to exist. The continual gliding of the two surfaces rubbing against each other produces, aside from heat, a fine metallic dust which precipitates upon the gliding surfaces. This causes the occurrence of grooves and ridges that tend to catch into each other so that considerable friction work must be done if gliding is to be possible at all. In this condition, the device no longer operates satisfactorily so that, for instance in an electric contact device, the occurrence of bouncing is no longer prevented. This affects not only the mechanical behavior of the device but, in electrical inverters, pendulous converters and similar periodically operating devices, also impairs the oscillatory or electric characteristics. The mechanical wear of the metal surfaces due to friction is aggravated by the fact that the frictional heat causes the friction surfaces to oxidize, and this has the result that a relatively small number of consecutive contact closures suffices to cause excessive contact bouncing.

It is known to reduce such trouble by making the two mutually contacting friction surfaces of different respective materials, but the results leave much to be desired and fall short of obviating the above-mentioned disturbances. It has been attempted, therefore, to lubricate the friction surfaces. However, the lubricant may creep or otherwise get upon the electric contact areas and then have a destructive effect during electric switching.

It is an object of our invention to securely minimize or virtually eliminate the disturbances described.

To this end, and in accordance with our invention, we form one or both of the mutually engageable friction surfaces in a motion-stopping device, particularly in an electric contact device, from a material which, aside from the predominant amount of the friction metal ordinarily used for the particular purpose to be served, contains an alloyed addition of one or more of the metals indium, cadmium, lead, gallium, thallium in an amount from about 1% to about 10% by weight of the total composition, an amount between 4% and 10% being preferable in most cases. These addition metals are from the second, third and fourth groups of the periodic system of elements and are all members of the second subgroups in the respective main groups. The addition metals have all a low melting point, not higher than that of lead (327° C.), and, as such, are ductile and soft at normal temperature, in contrast to the much higher melting or fusion temperature and the much greater hardness of the metallic base material to which they are added.

The base material to which the addition is made may consist of any of the metals or alloys known for use as a friction-surface member, namely silver, copper, bronze, German silver, brass and other metals, metal compounds, or metal alloys of similar friction or gliding properties, such as spring steel or homogeneous steel, for example. The particular base material, of course, is chosen in accordance with the particular purpose of the device and, in this respect, need not differ from the material ordinarily used for that purpose. For instance, silver and copper or alloys thereof are preferably used, in conjunction with the above-described alloying addition, if the motion-stopping device is also called upon to operate as an electric contact maker of low resistance so that the glide surfaces operate to pass electric current between the mutually engaging members.

The following examples were produced by adding to a melt of the base material the required amount of one or more of the addition metals (In, Cd, Pb, Ga, Tl).

TABLE NO. 1

1. 97% Ag, 3% In
2. 96% Ag, 2.5% In, 1.5% Cd
3. 90% Ag, 5% Cu, 5% In
4. 88% Ag, 6% Cu, 3% In, 3% Cd
5. 98% Cu, 2% In
6. 95% Cu, 2% In, 3% Cd
7. 4.5% Ag, 90% Cu, 4.5% In, 1% Cd (Ag-bronze)
8. 88% Cu, 8% Sn, 4% In (Sn-bronze)
9. 88% Cu, 9% Al, 3% In (Al-bronze)
10. 60% Cu, 23% Sn, 12% Ni, 5% In (German silver)
11. 58% Cu, 37% Zn, 2% In, 3% Cd (brass)
12. 56% Cu, 36% Zn, 5% Cd, 2.5% Pb, the remainder contains 0.1 to 0.5% C (brass)
13. 96% Fe with 0.1 to 0.9% C, remainder In (spring steel)
14. 69% Fe, 9.5% Ni, 18.5% Cr, 3% In (steel)
15. 66% Fe, 10% Cr, 19% Mn, 4.5% In, the remainder contains less than 0.15% Ni and 0.05 to 0.15% C (steel)
16. 97% Ti, 3% Cd
17. 87% Cu, 9% Sn, 0.3% C, 1% Ga, Tl, remainder indium.

Generally, the properties of these materials, as regards strength, resiliency and applicability as friction metals, are similar to the respective base metals to which the addition is made. Accordingly, the specified materials are to be chosen from the same viewpoint as the base metals, many of which are indicated above in parentheses by their customary designations. However, by virtue of the added substances, the compositions are superior to the respective base metals by securing uniform action between the mutually engaging surfaces virtually without frictional loss of material and independent of the number of the contact making operations. The operation of the rubbing surfaces is completely dry. Lubrication of the gliding friction surfaces by oil or grease is unnecessary, thus preventing any lubricant from creeping onto the contact surfaces proper. In this manner, the danger of damaging or destroying the contacts due to increased arcing, as may result from excess of lubricant, is completely eliminated. The absence of lubricant also prevents soiling of the friction surfaces due to drying or resinification of the lubricant material, thus obviating the danger of sticking of the friction surfaces. Even with a frictional motion number of $10^9$ the friction surfaces continue to operate completely satisfactory.

In the above-listed compositions, the addition metals are alloyed by melting with the respective base metals. However, the addition metals may also be joined and alloyed with the base metal of the friction surfaces by sintering. Another way of forming the desired alloys according to the invention is to place the additional metals as a coating onto the friction surface of the base material and then forming an alloy by a heat treatment which causes the metal of the coating to diffuse into the base material. The coating may be produced galvanically, such as by electrolytic precipitation, or also by vaporizing the additional metal onto the surface to be coated. Preferably, the vaporization is carried out by forming or coating a cathode from the additional metal and electrically vaporizing the cathode in vacuum onto the anodically connected base material.

According to another, more specific feature of our invention, we prefer using indium as the additional metal. In most cases indium has been found to be more favorable than the other above-mentioned metals from the second, third and fourth groups of the periodic system. Indium metal is resistant to corrosion and also suppresses the occurrence of oxydation and corrosion otherwise due to the development of frictional heat. Besides, indium has excellent lubricating properties and, in dependence upon the particularly proportion of indium relative to the amount of the basic friction metal, increases the viscosity or tenacity of the alloy. The alloy thus formed is also resistant to chemical attack, particularly by sulphuretted hydrogen and organic acid contained in lubricating oils.

For securing a particularly high resistance to corrosion in conjunction with a particularly good gliding and lubricating ability, it is preferable to use as the addition metal an alloy of indium with one or more other metals of the second, third and fourth groups of the periodic system, particularly one or more of cadmium, lead, gallium and thallium. This permits reducing the necessary quantity of indium.

The invention will be more fully understood from the embodiments described presently with reference to the drawing in which various electric contact devices with movable contact springs are illustrated, although it will be understood that motion-stopping devices with friction surface members composed and applied according to the invention are similarly applicable for damping the motion and preventing bouncing in other mechanically oscillating systems.

Figs. 1 to 8 of the drawing show respective views of eight different electric contact devices, each having a contact spring which oscillates at relatively high frequency, such as 50 or 60 cycles per second or more, in order to periodically open and close electric circuits. The same reference characters are applied in all illustrations for denoting similar components respectively.

Fig. 1 shows an electric contact device based upon the known friction-spring principle. The device has an armature assembly A mounted on a stationary support B by means of a leaf spring C so that the assembly A is elastically rotatable about a geometric pivot axis at D. The armature assembly A comprises two contact springs, 1a, 1b and, when in operation, is subjected to an alternating magnetic field between two field poles $P_1$ and $P_2$ so as to continuously oscillate about the axis D. The contact springs 1a and 1b are equipped with respective electric contacts 4a and 4b located opposite respective stationary contacts 5a and 5b. The contact springs 1a and 1b have respective friction zones 2a and 2b facing each other. During the periodic contact operation the surfaces of friction zones 2a and 2b rub against each other, thus preventing the occurrence of bouncing at the contacts. The contact springs 1a and 1b consist of silver, copper, bronze, German silver, brass, steel or any other suitable material. However, in the friction zones 2a and 2b the base metal of each contact spring is alloyed with at least one of the above-mentioned addition metals, for instance indium.

Figure 2:
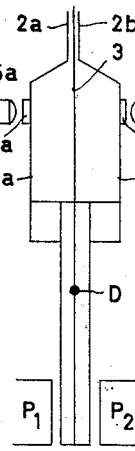

According to Fig. 2, showing a device largely similar to that of Fig. 1, the surfaces of the two friction zones 2a and 2b do not rub directly against each other. Instead, an additional spring 3 consisting, for instance, of an indium alloy is located between the two friction surfaces. However, the additional spring 3 may consist of any other suitable material and may have its friction zone coated with a thin layer, for instance, of an indium alloy.

Figure 3:
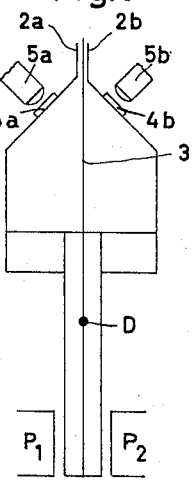

The device according to Fig. 3 differs from that of Fig. 2 in that the contact springs 1a and 1b, carrying the movable contact members 4a and 4b, extend in an inclined direction relative to the axis of oscillation.

Figure 4:
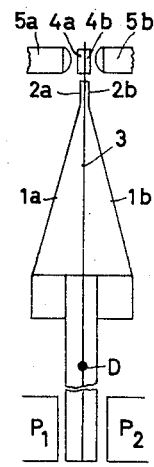

According to Fig. 4 the additional spring 3 carries the movable contacts 4a and 4b of the device, whereas the springs 1a and 1b operate to dampen the oscillations of the spring 3 by having their respective friction zones 2a and 2b enter into rubbing engagement with the spring 3.

Figure 5:
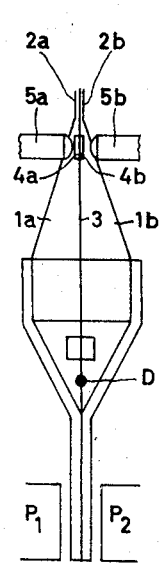

The contact device according to Fig. 5 is basically similar to that of Fig. 4 except that the movable contacts 4a and 4b mounted on spring 3 are located beneath the friction surfaces of zones 2a and 2b.

Figure 6:
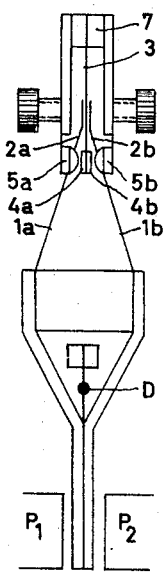

The contact device shown in Fig. 6 is also similar to those already described. However, the spring 3 on which the movable contacts 4a and 4b are mounted, is secured to a separate, stationary mounting block 7.

Figure 7:
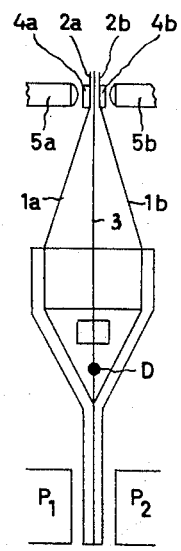

In the device shown in Fig. 7, the movable contacts 4a and 4b, mounted on respective contact springs 1a and 1b, are located at the same elevation as the friction surfaces 2a and 2b. The contact 4a is located in the rear of friction zone 2a, and the contact 4b lies on rear of friction zone 2b.

Figure 8:
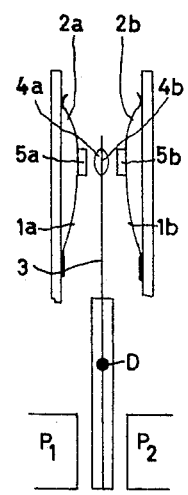

In the device according to Fig. 8, the contacts 4a and 4b secured to spring 3 rest against the contact springs 1a and 1b which carry the respective counter contacts 5a and 5b. This secures a sliding frictional movement of the surfaces of friction zones 2a and 2b relative to the stationary counterbearings 6a and 6b.

As mentioned, a large variety of alloys formed by the basic friction metal and the added component of the indium group are applicable as friction members in devices of the type exemplified by the illustrated embodiments. The following tabulation presents a compilation of preferred percentage ranges for a number of compositions including those of Table No. 1.

TABLE NO. 2

*Examples of preferred ranges*

| No. | Basic Friction Metals | | | | | | | | |
|---|---|---|---|---|---|---|---|---|---|
| | Ag | Cu | Fe | Sn | Zn | Ni | Cr | Al | Be |
| 21 | 95–99 | | | | | | | | |
| 22 | 95–99 | | | | | | | | |
| 23 | 88–92 | 1–7 | | | | | | | |
| 24 | 88–92 | 1–7 | | | | | | | |
| 25 | | 95–99 | | | | | | | |
| 26 | | 95–99 | | | | | | | |
| 27 | 2–6 | 88–92 | | | | | | | (silver bronze) |
| 28 | | 85–89 | | 6–10 | | | | | (tin bronze) |
| 29 | | 25–65 | | 13–35 | | 5–17 | | | (German silver) |
| 30 | | | 65–70 | | | 8–10 | 17–19 | | (V2a-steel) |
| 31 | | | 64–68 | | | <0.15 | 9–11 | | (Cr-Mn-steel) |
| 32 | | 89–94 | | | | | 1–6 | | (Cr-Cu-bronze) |
| 33 | | 85–91 | | | | | | 8–10 | (Al-bronze) |
| 34 | | | 94–98 | | | | | | (spring steel) |
| 35 | | 58–61 | | | 36–38 | | | | (brass) |
| 36 | | 56–60 | | | 35–37 | | | | (brass) |
| 37 | | | | | | | | 95–99 | |
| 38 | | | | | | | | 94–98 | |
| 39 | | | | | | | | | |
| 40 | | 92.6–97.3 | (Cu-Be-bronze) | | | | | | 1.7–2.4 |
| 41 | | 92–97 | (Cu-Be-bronze) | | | | | | 1.7–2.4 |
| 42 | | | (Ni-Be-bronze) | | | 91–96 | | | 1.9 |
| 43 | | 84–88 | | 6–10 | | | | | |
| 44 | | 84–88 | | 6–10 | | | | | |
| 45 | | 84–88 | | 6–10 | | | | | |
| 46 | | | | | | | | 93–97 | |
| 47 | 2–6 | 86–90 | | | | | | | |

| No. | Basic Friction Metals | | | | Addition Metals | | | | |
|---|---|---|---|---|---|---|---|---|---|
| | Mn | Ti | C | P | In | Cd | Pb | Ga | Tl |
| 21 | | | | | 1–5 | | | | |
| 22 | | | | | 0.5–4 | 2–4 | | | |
| 23 | | | | | 1–5 | | | | |
| 24 | | | | | 0.5–4 | 2–4 | | | |
| 25 | | | | | 1–5 | | | | |
| 26 | | | | | 0.5–4 | 2–4 | | | |
| 27 | | | | | 1–5 | 0–1.5 | | | |
| 28 | | | | | 1–5 | | | | |
| 29 | | | | | 1–5 | | | | |
| 30 | | | | | 1–5 | | | | |
| 31 | 17–20 | | 0–05–0.15 | | 1–5 | | | | |
| 32 | | | | | 1–5 | | | | |
| 33 | | | | | 1–5 | | | | |
| 34 | | | 0.1–0.9 | | 1–5 | | | | |
| 35 | | | | | 0.5–4 | 2–4 | | | |
| 36 | | | 0.1–0.5 | | | 2–6 | 1–3 | | |
| 37 | | | | | 1–5 | | | | |
| 38 | | | | | 1–3 | 2–5 | | | |
| 39 | | 96–99 | | | 1–4 | | | | |
| 40 | | | | | 1–5 | | | | |
| 41 | | | | | 0.5–3 | 2–4 | | | |
| 42 | 1 | | | | 0.5–4 | 2–4 | | | |
| 43 | | | | | 0.5–4 | 2–4 | 1 | 1 | |
| 44 | | | 0–1–0.5 | | 0.5–4 | | | 1 | 1 |
| 45 | | | 0.1–0.5 | 0.1–0.5 | 0.5–4 | 2–4 | | | |
| 46 | | | 0.1–0.5 | | 0.5–4 | 2–4 | | | |
| 47 | | | 0.1–0.5 | | 0.5–4 | 0.2–2 | | | 1 |

Any desired composition within the indicated ranges can be accurately produced by admixing the addition metals to a melt of the basic metal. However, as mentioned, the alloys may also be produced by sintering or by cathodic vaporization followed by a heat treatment so that the coating of the addition metal diffuses into the adjacent zone of the basic friction metal. For instance, in the embodiment according to Fig. 1 the top ends of the contact springs 1a and 1b may be coated with indium at the location of the friction surfaces. By subjecting the coated ends to a temperature above the melting point of indium, the indium metal diffuses into the material of the springs and thus forms a diffusion zone corresponding to the zones 2a and 2b. The diffusion zone thus consists of a matrix of the spring metal such as steel or bronze, and the matrix is permeated and alloyed by the added indium. In all such cases where the production of the desired alloy by sintering or diffusion is involved, the above described percentages and ranges of composition are, of course, only approximate or average values, because the composition of the alloy varies from location to location within the friction zone.

It will be understood by those skilled in the art that the invention permits of various modifications and that the particular design and appearance of the illustrated examples of devices according to the invention are not essential as long as the device operates to frictionally stop or dampen the motion of movable structure by means of two mutually engageable friction surfaces of which at least one is composed of an alloy as described in the foregoing.

We claim:

1. In a motion-stopping device having two members one being movable into and out of engagement with the other, said two members having respective friction surfaces frictionally engageable with each other, at least one of said two members having a surface zone forming said friction surface and consisting in said zone of a material comprising about 90% to 99% of at least one good conducting metal selected from the group consisting of copper and silver, about 0.5% to 4% indium, the remainder containing from traces up to about 4% of cadmium.

2. A motion-stopping device comprising two spring members one being movable into and out of engagement with the other, said two members having respective friction surfaces frictionally engageable with each other, at least one of said two members having a surface zone forming said friction surface and consisting in said zone of a material comprising an alloy of a base substance of about 90% to 99% of alloy steel containing 64 to 70% iron and a remainder of at least one metal selected from the group consisting of nickel and chromium, and an addition of about 1% to 10% of substance selected from the group consisting of indium, cadmium, lead, gallium and thallium, all percentages being by weight of the total composition.

3. In an electric relay having an oscillating electrical contact carrying structure, a bounce-stopping device mounted on said structure having two members one being movable into and out of engagement with the other, said two members having respective friction surfaces frictionally engageable with each other, at least one of said two members having a surface zone forming said friction surface and consisting in said zone of a material comprising about 94 to 98% of spring steel and an addition of about 1 to 5% of indium alloyed therewith.

4. In an electric contact apparatus having means carrying a movable electric contact, a motion-stopping device for said means having two members one being movable into and out of engagement with the other, said two members having respective friction surfaces frictionally engageable with each other, at least one of said two members having a surface zone forming said friction surface and consisting in said zone of a material comprising a base substance of about 90% to 99% friction metal and in intimate mixture therewith an addition of about 1% to 10% of substance selected from the group consisting of indium, cadmium, lead, gallium and thallium, said friction metal consisting of brass containing copper in an amount of about 56% to 61% of the total composition, the remainder of the brass being zinc.

5. In an electric contact apparatus having means carrying a movable electric contact, a motion-stopping device for said means having two members one being movable into and out of engagement with the other, said two members having respective friction surfaces frictionally engageable with each other, at least one of said two members having a surface zone forming said friction surface and consisting in said zone of a material comprising a base substance of about 90% to 99% friction metal and in intimate mixture therewith an addition of about 1% to 10% of substance selected from the group consisting of indium, cadmium, lead, gallium and thallium, said friction metal consisting of bronze containing a substance selected from the group consisting of tin, aluminum, chromium and beryllium in respective amounts of 6 to 10%, 8 to 10%, 1 to 6% and 1.7 to 2.4% of the total composition, the remainder of the base substance being copper.

6. In an electric contact apparatus having means carrying a movable electric contact, a motion-stopping device for said means having two members one being movable into and out of engagement with the other, said two members having respective friction surfaces frictionally engageable with each other, at least one of said two members having a surface zone forming said friction surface and consisting in said zone of a material comprising a base substance of about 90% to 99% friction metal and in intimate mixture therewith an addition of about 1% to 10% of substance selected from the group consisting of indium, cadmium, lead, gallium and thallium, said friction metal constituting a member of the group consisting of copper, silver, titanium, and the alloys steel, bronzes, German silver and brass.

7. In an electric contact apparatus having means carrying a movable electric contact, a motion-stopping device for said means having two members one being movable into and out of engagement with the other, said two members having respective friction surfaces frictionally engageable with each other, at least one of said two members having a surface zone forming said friction surface and consisting in said zone of a material comprising a base substance of about 90% to 99% friction metal and in intimate mixture therewith an addition of about 0.5 to 4% of indium, said friction metal constituting a member of the group consisting of copper, silver, titanium, and its alloys steel, bronzes, German silver and brass.

References Cited in the file of this patent
UNITED STATES PATENTS

| | | |
|---|---|---|
| 1,847,941 | Gray et al. | Mar. 1, 1932 |
| 2,417,967 | Booe | Mar. 25, 1947 |
| 2,606,259 | Huetten | Aug. 5, 1952 |